H. HARRIER.
Grain Binder.
3 Sheets—Sheet 2.
No. 57,710.
Patented Sept. 4, 1866.
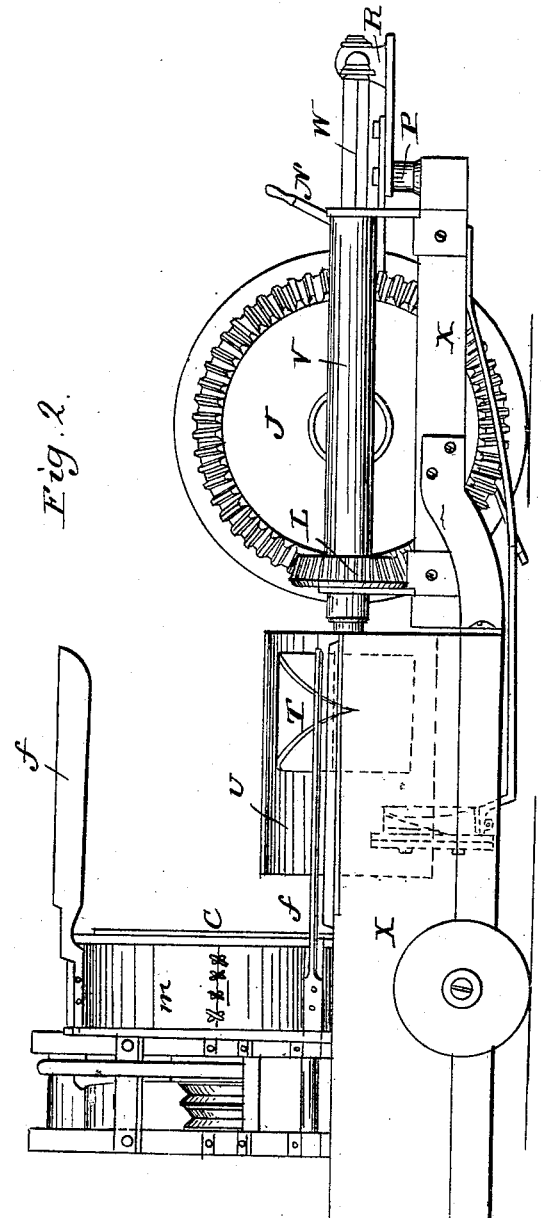

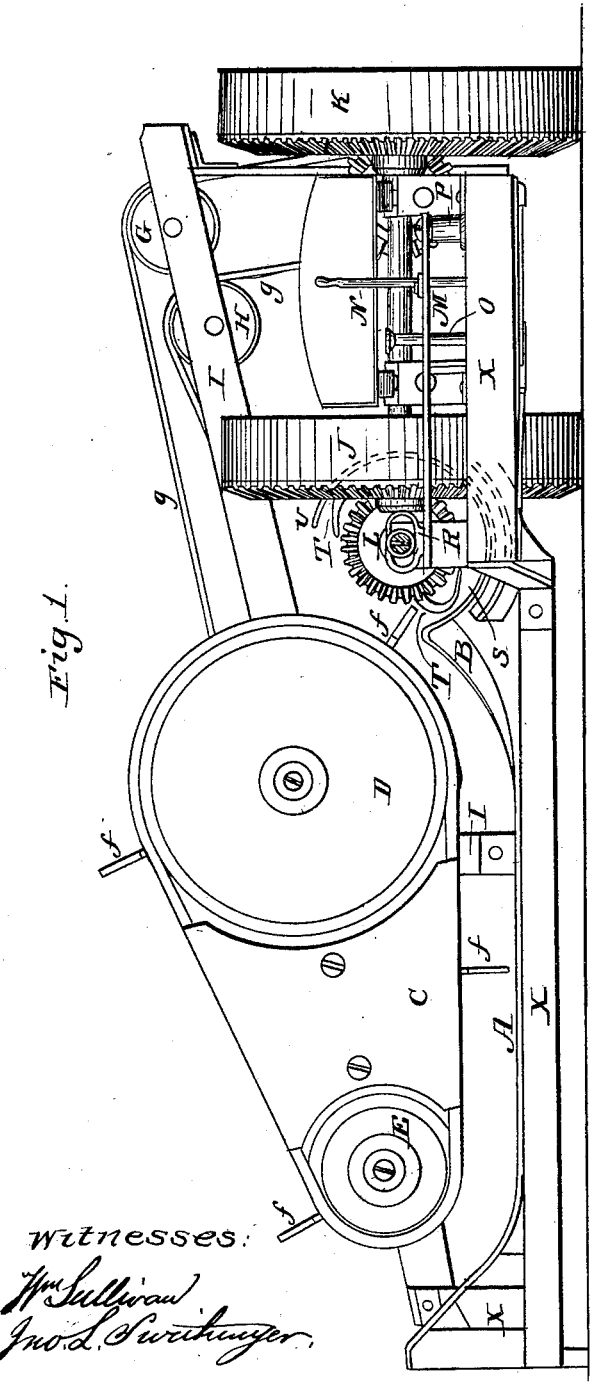

H. HARRIER.
Grain Binder.
No. 57,710.
3 Sheets—Sheet 3.
Patented Sept. 4, 1866.
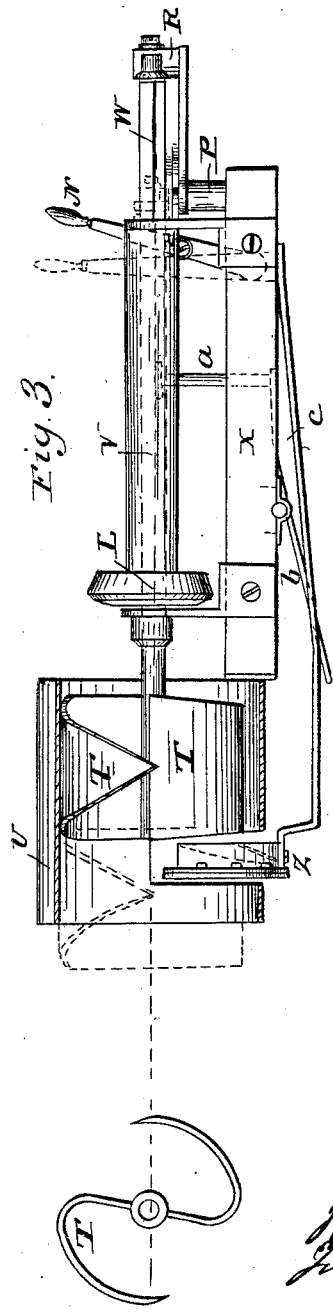
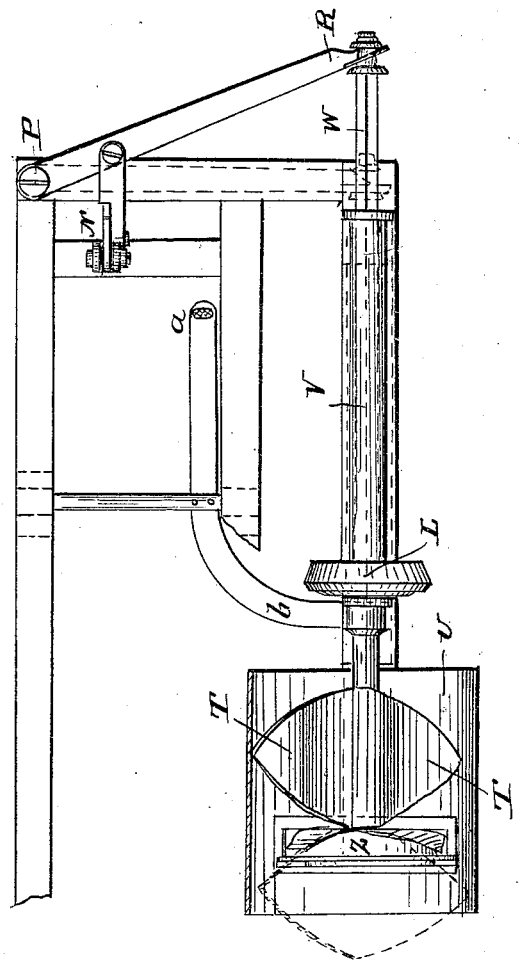
Witnesses:
Inventor:
Henry Harrier

UNITED STATES PATENT OFFICE.

HENRY HARRIER, OF INDIANAPOLIS, INDIANA.

IMPROVEMENT IN GRAIN-BINDERS.

Specification forming part of Letters Patent No. 57,710, dated September 4, 1866.

*To all whom it may concern:*

Be it known that I, HENRY HARRIER, of Indianapolis, Marion county, and State of Indiana, have invented a new and useful Machine (called "Hoosier Binder") for Binding Grain; and I do hereby declare that the following is a clear, full, and exact description of the construction and operation of the same, reference being had to the annexed drawings, making part of this specification, in which—

Figure 1 is a long-end view; Fig. 2, a short-end view; Fig. 3, a section of the binder, and Fig. 4 a top view of the same.

The nature of my invention consists in constructing a grain-binder and attaching it to a reaper in the following manner:

I construct a tube or cylinder, V, and attach to one end of it a cog-wheel, L. This cog-wheel plays into the cogs of the cog-wheel J. The inside of this cylinder V is square, so as to fit snugly to the shaft W, on one end of which is the grain-gatherer T. This grain-gatherer T plays in a concave, U, which is attached to the inclined plane A. An endless belt, $m$, plays around the pulleys E and D. This belt is supplied with four rakes. They are so attached to the belt that three of them will gather the grain on the inclined plane as much as necessary to keep it out of the way of the falling grain, while the fourth will push it into the concave. The spring $a$ forces Z into the concave from below, for which purpose an opening is left in the concave. When the grain passes around in the concave, the grain-gatherer T, in its rotary motion inside of the concave U, owing to its peculiar shape, will part the grain in two halves, hold each half inside of its curve, and revolve around in the concave U. This grain-gatherer only extends to one-half of the length of the grain, and therefore leaves the balance revolving around in one body, while the arrangement Z, with its hook, is forced up into the concave U in such a way that it will hook such parts of the grain all around the bundles as are requisite to make the band, draw it around the bundle in the reverse direction from the grain in the gatherer, and twist and tuck it under continually, making a twisted endless band all around the sheaf.

I provide the inclined plane A with two flanges—one for the purpose of straightening the butts of the grain, and the other for the purpose of passing the three rakes (which gathered the grain) over the same. The lever R, which is attached to the rear end of the shaft W, will push the sheaf out of the concave, so as to be ready for the next sheaf.

I do not claim any part of the rake, nor the reaper; but

What I do claim, and desire to secure by Letters Patent of the United States, is—

1. The cylinder V, with its square shaft W, the grain-gatherer T, and the concave U.

2. The combination of the spring $a$ with the arrangement Z and the lever R.

HENRY HARRIER.

Witnesses:
   WM. SULLIVAN,
   JNO. L. SMITHMYER.